Patented Feb. 9, 1937

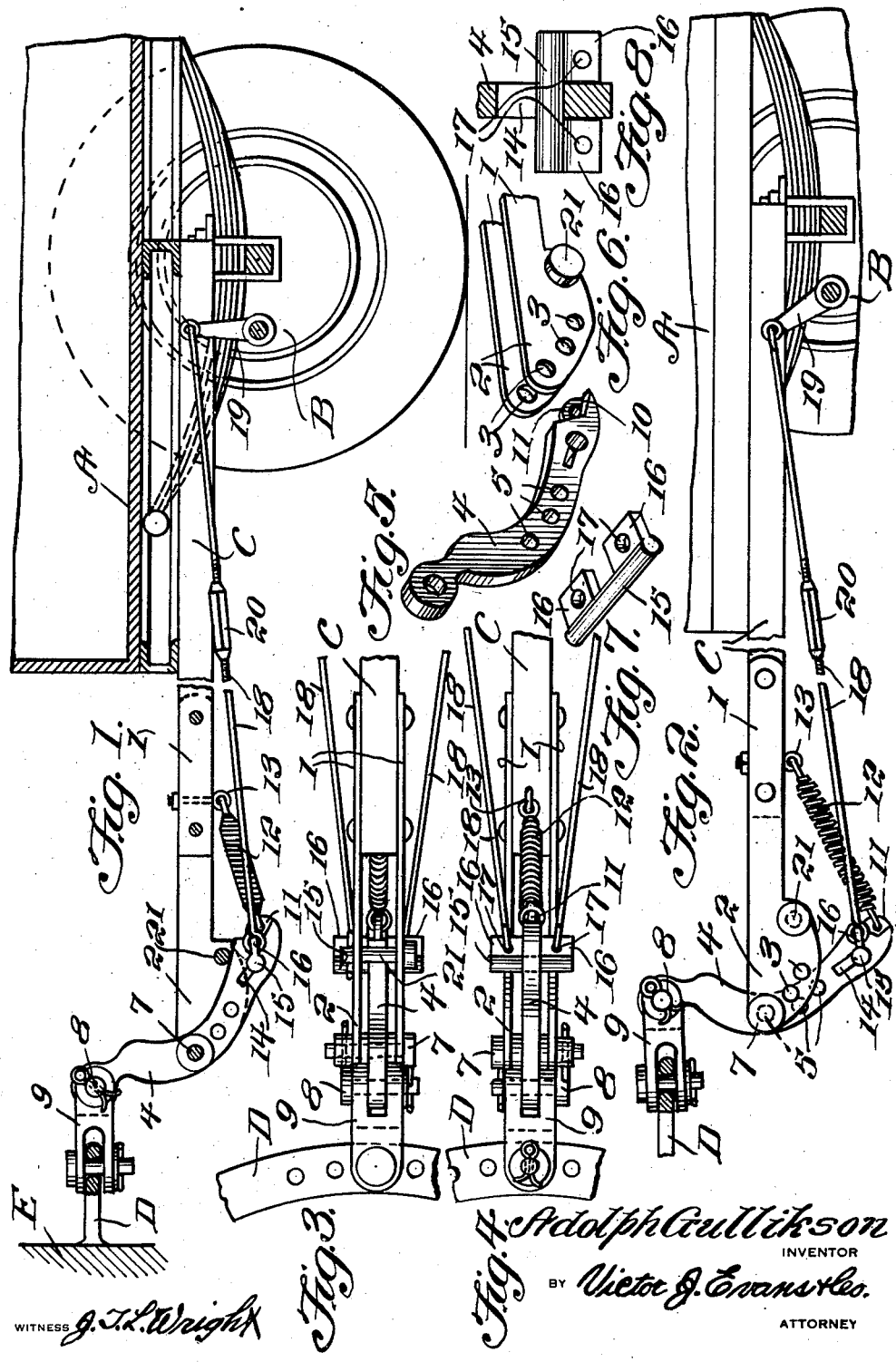

2,070,481

UNITED STATES PATENT OFFICE 2,070,481

AUTOMATIC BRAKING DEVICE

Adolph Gullikson, Cheyenne, Wyo.

Application November 27, 1935, Serial No. 51,894

1 Claim. (Cl. 188—142)

This invention relates to trailers and its general object is to provide a brake operating mechanism primarily designed for use with trailers to automatically apply the brakes thereof, when the towing vehicle slows down or stops so that the trailer is under complete control at all times, and will in no way affect the braking action of the towing vehicle.

A further object of the invention is to provide a brake operating mechanism that can be easily and expeditiously applied to trailers having two or four wheel brakes, without changing the brake structure thereof, and which acts as the draft means for the trailer, with the result all movement of the towing vehicle is transmitted to the trailer to bring about the automatic control of the latter.

Another object of the invention is to provide a braking device for trailers, that can be rendered inactive, is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a side elevation showing my device applied to a trailer and attached to a towing vehicle.

Figure 2 is a similar view showing the device in position with the brakes applied.

Figure 3 is a top plan view thereof.

Figure 4 is a bottom plan view.

Figure 5 is a detail view of the operating lever.

Figure 6 is a fragmentary view of the tongue attachment for the trailer.

Figure 7 is a perspective view of the brake rod attaching key or member.

Figure 8 is a sectional view taken through the operating lever with the brake rod attaching key thereof in elevation.

Referring to the drawing in detail, the letter A indicates a trailer of the usual two wheel brake type and a brake B is shown, together with the tongue C which is attached to the chassis as shown.

While the tongue may have a bifurcated forward portion, I have shown a pair of tongue members or plates 1, disposed upon opposite sides of the tongue and secured thereto in a manner to extend beyond the forward end thereof for disposal in spaced parallel relation with respect to each other.

The forward ends of the members 1 are enlarged as at 2, and these enlarged portions extend downwardly from the major portion of the members 1, and are provided with curved lower edges, as shown, as well as a plurality of registering openings 3.

Mounted for rocking movement between the enlarged portions of the members 1, is a lever 4 having a plurality of openings 5 therein, for registration with any one pair of the openings 3 of the enlarged portions, and preferably the uppermost openings, for the purpose of receiving a pivot pin 7 for rockably mounting the lever, as will be apparent.

The lever is of substantially arcuate formation, but the upper end thereof is forwardly directed and has an opening therein for the purpose of receiving a pivot pin 8 for pivotally securing a clevis member 9 thereto, the latter having bifurcated ends arranged at right angles with respect to each other, with the arms of the rear bifurcated end disposed upon opposite sides of the forwardly directed end of the lever 4, while the forward bifurcated end or portion of the member 9 is detachably secured to suitable connecting means D carried by the towing vehicle E, and by that structure, it will been that the clevis member acts in the capacity as a universal joint.

The rear or lower end of the lever 4 is recessed as at 10, with an apertured ear 11 extending from the recess for the purpose of securely receiving one end of a coil spring 12, while the opposite end is secured to the tongue C through the instrumentality of an eye bolt 13, consequently, it will be seen that the lever is normally held in the position as shown in Figure 1 with the brakes released.

Adjacent to the lower end of the lever there is provided a key hole shaped slot 14 for the purpose of receiving what may be termed a key 15, but in any event it includes a shank having lugs or wards 16 formed thereon and extending therefrom in alignment with each other, with openings 17 therein for the purpose of receiving the forward ends of brake rods 18, the rear ends of the brake rods being secured to the brake arms 19 of the brakes B, as clearly shown in Figures 1 and 2. The brake rods are of the usual construction, and include turn buckles 20 for adjusting the length thereof.

The enlarged portions 2 are provided with openings to receive a bolt 21 for disposal in the path of the lever 4, as best shown in Figure 1, in order to act as an abutment means therefor and the lever is normally held in contact therewith by the coil spring 12.

In the event that it is desired to render my braking device inactive, the bolt 21 can be removed and passed through the lowermost openings 3 and 5, in order to prevent the lever 4 from rocking.

In the operation of my braking device, it will be obvious that in the event the towing vehicle should slow down or stop, the lever 4 will be rocked on its pivot to the position as shown in Figure 2 and thereby pull upon the brake rods 18 and apply the brakes B. However, just as soon as the rearward pressure on the lever is relieved, the spring 12 will pull the same to its normal position of Figure 1, and thereby release the brakes.

In the event it is desired to use my braking device with a trailer that is equipped with four wheel brakes, any suitable well known connecting means may be used between the lugs 16 and the usual cross bar of the four wheel brake structure.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An automatic braking device for a trailer, comprising draft means including a pair of elongated plates secured to the outer end of the tongue of the trailer, and including enlarged spaced parallel forward portions having registering openings therein, a lever having openings to register with any of the registering openings of the forward portions, pivot means for disposal through registering openings of the lever and forward portions to rockably mount the lever between said portions, a bolt disposed through the forward portions and arranged in the path of the rear end of the lever to limit the rocking movement thereof, spring means for normally urging and holding the lever against the bolt, said bolt being removable for disposal in other registering openings of the lever and forward portions to secure the lever against movement, for rendering the braking device inactive, universal means for connecting the forward end of the lever to a towing vehicle, said lever having a key hole shaped slot arranged adjacent the rear end thereof, a key member including a shank having apertured lugs thereon and removably mounted in the slot for disposing the lugs upon opposite sides of the lever, and means of connection between the lugs and the brakes of the trailer and secured in the apertures of the lugs.

ADOLPH GULLIKSON.